(12) United States Patent
Jeon et al.

(10) Patent No.: US 12,246,203 B2
(45) Date of Patent: Mar. 11, 2025

(54) SPRINKLER COUPLING STRUCTURE

(71) Applicant: YEONEUN CO., LTD., Hwaseong-si (KR)

(72) Inventors: So Yeon Jeon, Hwaseong-si (KR); Young Ae Song, Asan-si (KR)

(73) Assignee: YEONEUN CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/010,221

(22) PCT Filed: Sep. 8, 2022

(86) PCT No.: PCT/KR2022/013551
§ 371 (c)(1),
(2) Date: Dec. 14, 2022

(87) PCT Pub. No.: WO2023/075135
PCT Pub. Date: May 4, 2023

(65) Prior Publication Data
US 2024/0299791 A1 Sep. 12, 2024

(30) Foreign Application Priority Data
Oct. 27, 2021 (KR) .................. 10-2021-0144473

(51) Int. Cl.
*F16L 41/14* (2006.01)
*A62C 35/68* (2006.01)

(52) U.S. Cl.
CPC .............. *A62C 35/68* (2013.01); *F16L 41/14* (2013.01)

(58) Field of Classification Search
CPC .............. F16L 41/14; F16L 5/06; A62C 35/68
See application file for complete search history.

(56) References Cited

U.S. PATENT DOCUMENTS

| 10,561,872 B2 * | 2/2020 | Dafonseca ............. A62C 35/68 |
| 2002/0185282 A1 * | 12/2002 | Kretschmer ........... A62C 31/02 52/168 |
| 2002/0195817 A1 * | 12/2002 | Choi ...................... F16L 11/115 285/55 |

(Continued)

FOREIGN PATENT DOCUMENTS

| JP | 2009-095638 A | 5/2009 |
| KR | 20-1999-0039866 U | 11/1999 |

(Continued)

*Primary Examiner* — Zachary T Dragicevich
*Assistant Examiner* — James A Linford
(74) *Attorney, Agent, or Firm* — LRK PATENT LAW FIRM

(57) ABSTRACT

A sprinkler coupling structure, including a reducing nipple configured to penetrate a through hole formed in a ceiling panel and manufactured integrally with a flexible pipe body whose upper side is connected from a water supply source and into which fire extinguishing water flows, a head coupled to a lower end of the reducing nipple and configured to spray the fire extinguishing water supplied from the water supply source through the reducing nipple, a nipple fixing member configured to fix and couple the reducing nipple to the ceiling panel so that a height at which the reducing nipple protrudes from the ceiling panel is adjusted, and a head protection net configured to protect the head from under the ceiling panel.

3 Claims, 7 Drawing Sheets

(56) References Cited

U.S. PATENT DOCUMENTS

| | | | |
|---|---|---|---|
| 2006/0113094 A1* | 6/2006 | Silva | A62C 35/62 169/17 |
| 2007/0051522 A1* | 3/2007 | Chiuchiolo | A62C 37/08 169/37 |
| 2011/0315409 A1* | 12/2011 | Silcox | A62C 35/68 248/343 |

FOREIGN PATENT DOCUMENTS

| | | |
|---|---|---|
| KR | 20-0270116 Y1 | 3/2002 |
| KR | 20-2010-0004181 U | 4/2010 |
| KR | 10-2012-0003329 A | 1/2012 |
| KR | 10-1725009 B1 | 4/2017 |
| KR | 10-2183779 B1 | 11/2020 |
| KR | 10-2431469 B1 | 8/2022 |

* cited by examiner

SPRINKLER COUPLING STRUCTURE

CROSS-REFERENCE TO RELATED APPLICATIONS

The present application is a U.S. National Phase entry from International Application No. PCT/KR2022/013551, filed on Sep. 8, 2022, which claims priority to Korean Patent Application No. 10-2021-0144473, filed on Oct. 27, 2021, the disclosure of which is incorporated by reference herein in their entirety.

TECHNICAL FIELD

The present disclosure relates to a sprinkler coupling structure and, more particularly, to a sprinkler coupling structure that involves a flexible pipe body and an integrally manufactured reducing nipple, allows easy assembly of a sprinkler and length adjustment of the reducing nipple according to the thickness of a ceiling panel, and ensures that the sprinkler is tightly secured to the ceiling panel when installed to seal a through hole of the ceiling panel.

BACKGROUND ART

These days, a plurality of sprinklers are installed on a ceiling of structures such as large buildings or buildings vulnerable to fire to automatically release water at an early stage of ignition.

In particular, in the case of structures equipped with semiconductor facilities, sprinklers should be installed on mold bar ceilings or panel ceilings that create relatively little ceiling dust in order to prevent the creation of fine dust from the ceiling.

The mold bar-type ceiling is formed by arranging T-shaped mold bars upside down and placing a plate between individual mold bars to form a ceiling, whereas the panel-type ceiling is made up by attaching and fixing ceiling boards such as SGP panels without gaps to a ceiling frame installed to be spaced apart from the top of the building to form a ceiling.

Korean Patent No. 10-2183779 discloses one example of a sprinkler installation structure for a mold bar type ceiling as shown in FIG. 1. According to this installation structure, a sprinkler 101 penetrates a connection block 103 located at the intersection of the crosswise mold bars 102 and is positioned downward, and a support 120 is provided at one point of a reducer 110 constituting the vertical tube of the sprinkler 101, protrudes in both directions, and the sprinkler 101 is fixedly coupled to the upper surfaces of the mold bars 102 so that a head 130 of the sprinkler 101 is fixedly coupled to the ceiling in a downward state.

However, unlike the above case of the mold bar type ceiling, in order to connect a sprinkler to a panel-type ceiling, a through hole must be drilled in a ceiling board to allow the sprinkler to pass through. Yet, the problem here is that when you use the sprinkler after installing the sprinkler to penetrate the through hole in the ceiling board without finishing, fine dust may enter the room through the through hole.

One example of a sprinkler installation structure for a panel-type ceiling to solve the above-mentioned problem is disclosed in Korean Patent No. 10-1725009 as shown in FIG. 2. According to this installation structure, a through hole is drilled in a ceiling board 202, and an upper member 210 and a lower member 220 are installed around the through hole 212 on the upper and lower surfaces of the ceiling board 202, respectively, so as to cover the inner circumferential surface of the through hole 212. Then, a threaded portion (not shown) is formed in an upper central groove of the upper member 210, and a detachable ring portion (not shown) screwed to the outer circumferential surface of a reducing nipple 230 is screwed into the threaded portion, so that the reducing nipple 230 to which a head 240 is coupled passes through the upper member 210 and the lower member 220 coupled to the through hole 212 and is fixedly coupled to the detachable ring portion in a downward state.

However, in this case, since the fastening structure is unique as the detachable ring portion (not shown) screwed to the outer circumferential surface of the reducing nipple 230 and the threaded portion (not shown) formed in the upper central groove of the upper member 210 are screwed together in a reverse way unlike the usual way, it often happens that field workers do not properly perform the screwing work of the reverse method above, which reduces work efficiency.

Moreover, the reducing nipple 230, which is connected from a water supply source and is assembled to be connected to a corrugated pipe 250 through which fire extinguishing water flows as shown in FIG. 2, needs to be separated from the upper member 210 when replacing the aged head 240. Yet, when the coupling between the corrugated pipe 250 and the reducing nipple 230 is released for this purpose, the fire extinguishing water flows out from the corrugated pipe 250 or the reducing nipple 230, leading to problems. Particularly, in a place where indoor environments need to be managed sensitively, such as a semiconductor production line, when indoor spaces are contaminated by the flowing fire extinguishing water, all operations must be stopped until the contamination is removed, which may cause enormous financial loss.

In addition, as shown in FIG. 2, when the reducing nipple 230 is coupled to the upper member 210 upon installation of a sprinkler, the length of the reducing nipple 230 protruding from the ceiling board 202 is determined according to the length of the reducing nipple 230 since the height at which the reducing nipple 230 is coupled to the upper member 210 is always the same. The problem is that since the typical reducing nipple 230 is manufactured with a fixed length, when the ceiling board 202 is thick, the length of the reducing nipple 230 protruding downward from the ceiling board 202 is insufficient, and thus a portion of the head 240 is positioned inside the through hole 212 of the ceiling board 202. Accordingly, when the fire extinguishing water is discharged from the head 240, the water discharge is blocked inside the through hole 212 so that the water is not evenly discharged.

Moreover, as shown in FIG. 2, the upper member 210 and the lower member 220 are respectively disposed at the upper and lower sides of the ceiling board 202 with the ceiling board 202 therebetween, thereby sealing the through hole 212 of the ceiling board 202 and preventing dust or fire extinguishing water from permeating the room through the through hole 212 of the ceiling board 202 at normal times. Yet, the fastening force of the upper member 210 and the lower member 220 alone is insufficient to completely seal the through hole 212.

DISCLOSURE

Technical Problem

The present disclosure has been made keeping in mind the problems occurring in the related art. An objective of the present disclosure is to provide a sprinkler coupling structure that allows a reducing nipple to be easily detached from a panel-type ceiling without loosening the coupling between the reducing nipple and a flexible pipe body.

An objective of the present disclosure is to provide a sprinkler coupling structure that allows the length of the reducing nipple to be adjusted according to the thickness of a ceiling panel, while making it simple and easy to assemble a sprinkler.

An objective of the present disclosure is to provide a sprinkler coupling structure in which a lower unit adheres strongly to the ceiling panel when installing the sprinkler to seal a through hole of the ceiling panel.

Technical Solution

In order to achieve the above mentioned objective, according to an embodiment of the present disclosure, there is provided a sprinkler coupling structure, including: a reducing nipple configured to penetrate a through hole formed in a ceiling panel, and manufactured integrally with a flexible pipe body whose upper side is connected from a water supply source and into which fire extinguishing water flows; a head coupled to a lower end of the reducing nipple and configured to spray the fire extinguishing water supplied from the water supply source through the reducing nipple; a nipple fixing means configured to fix and couple the reducing nipple to the ceiling panel so that a height at which the reducing nipple protrudes from the ceiling panel is adjusted; and a head protection net configured to protect the head from under the ceiling panel.

In addition, the nipple fixing means may include: an upper unit located at a top of the through hole of the ceiling panel and configured to have a nipple hole in a center thereof into which the reducing nipple is inserted; a lower unit inserted from a bottom of the through hole to be fixedly coupled to the upper unit, and configured to have a nipple hole in a center thereof into which the reducing nipple is inserted; an adjustment member coupled to an outer circumference of the reducing nipple so that a height thereof is adjusted, and seated on an upper side of the upper unit to support the reducing nipple; and a fastening member fastened to the upper side of the upper unit and configured to fix the reducing nipple to the upper unit by pressing the adjustment member when fastened to the upper unit.

In addition, the reducing nipple may have a male thread portion formed on a portion of the outer circumference thereof, and the adjustment member may have a female thread portion fastened to the male thread portion on an inner circumferential surface thereof, wherein when the female thread portion rotates on the male thread portion, the adjustment member may ascend or descend along the outer circumferential surface of the reducing nipple.

In addition, when the upper unit and the fastening member are fastened together with a right-handed screw, the female thread portion of the adjustment member and the male thread portion of the reducing nipple may be fastened together with a left-handed screw.

In addition, the lower unit may include: a first portion inserted into the through hole of the ceiling panel and coupled to a lower side of the upper unit; and a second portion formed under the first portion and having an upper surface in contact with a lower surface of the ceiling panel, wherein the second portion may be fitted with an adhesive member on the upper surface thereof, so that when the fastening member is fastened to the upper unit, the adhesive member may come into close contact with the lower surface of the ceiling panel.

In addition, the upper unit may be fitted with an O-ring on a surface in contact with the adjustment member, so that when the fastening member is fastened to the upper unit, the O-ring may come into close contact with a lower surface of the adjustment member and an upper surface of the upper unit.

Advantageous Effects

According to a sprinkler coupling structure of the present disclosure, since a reducing nipple is detachable from a ceiling panel while being integrally combined with a flexible pipe body, by separating the reducing nipple and an upper unit and then taking the entire reducing nipple and the flexible pipe body out of the ceiling panel without separating the reducing nipple and the flexible pipe body, the head may be replaced on the ceiling panel, preventing the leakage of fire extinguishing water from the reducing nipple into the indoor space where a sprinkler is installed.

In addition, since a nipple fixing means for fixing the reducing nipple to the ceiling panel and adjusting the height at which the reducing nipple protrudes from the ceiling panel is provided, when the ceiling panel is thick, by adjusting the position of an adjustment member of the nipple fixing means, the head coupled to the lower end of the reducing nipple can protrude downward more from a through hole of the ceiling panel, so that the discharge of fire extinguishing water from the head can be made evenly without being obstructed by the through hole of the ceiling panel.

Moreover, since a sprinkler is assembled by a simple method of configuring the nipple fixing means for fixing the reducing nipple to the ceiling panel with an upper unit, a lower unit, the adjustment member and a fastening member, inserting the upper unit and the lower unit into the through hole of the ceiling panel so as to be mutually fastened, and pressing the adjustment member after placing the adjustment member coupled to the reducing nipple on the upper side of the upper unit and then fastening the fastening member to the upper side of the upper unit, the sprinkler can be assembled without complicated processes, so that the assembly of the sprinkler can be done easily and conveniently.

Furthermore, by combining the upper unit of the nipple fixing means and the fastening means, when the fastening means presses the adjustment member, the entire upper unit rises by the fastening force of the fastening means, so that the lower unit coupled with the upper unit also rises, thereby ensuring strong attachment of the lower unit to the bottom surface of the ceiling panel. Accordingly, the through hole of the ceiling panel can be firmly sealed by the close contact of the lower unit on the bottom surface of the ceiling panel without relying on the fastening force of the upper unit and the lower unit, and therefore, it is possible to more effectively prevent dust or fire extinguishing water from permeating the room through the sprinkler or through hole of the ceiling panel at normal times.

BEST MODE

Figure 1:
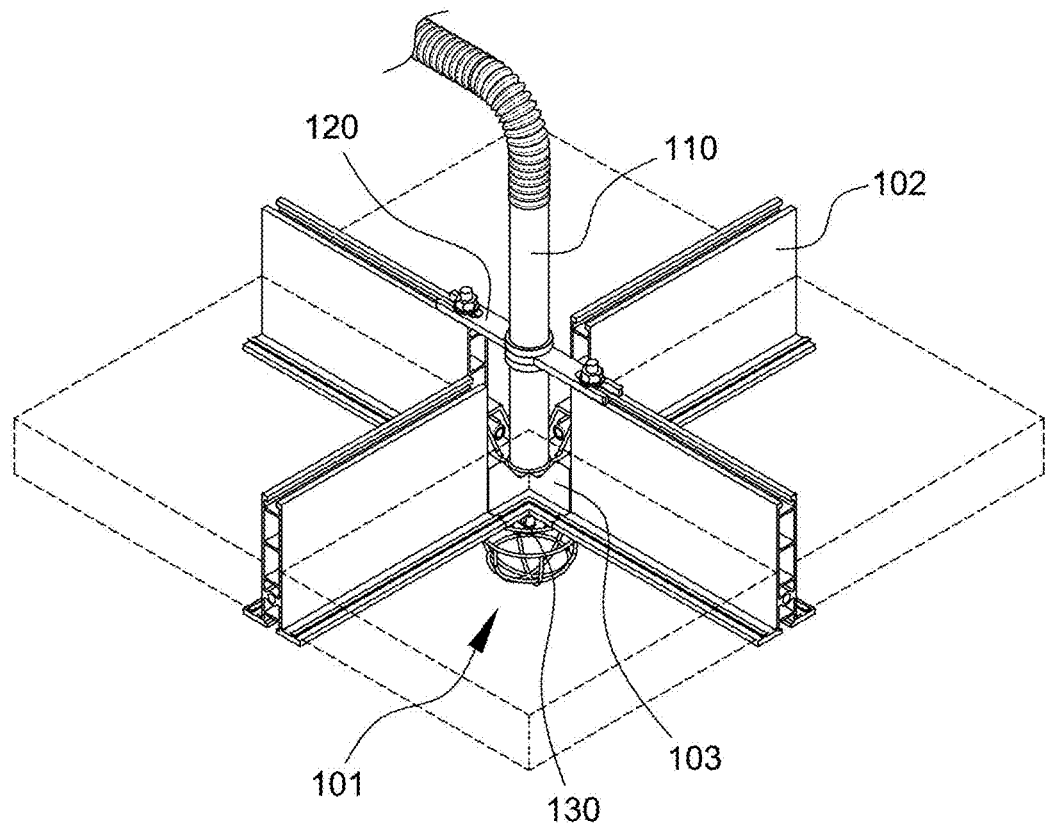
FIG. 1 is a perspective view of a sprinkler coupling structure coupled to a conventional mold bar-type ceiling.
Figure 2:
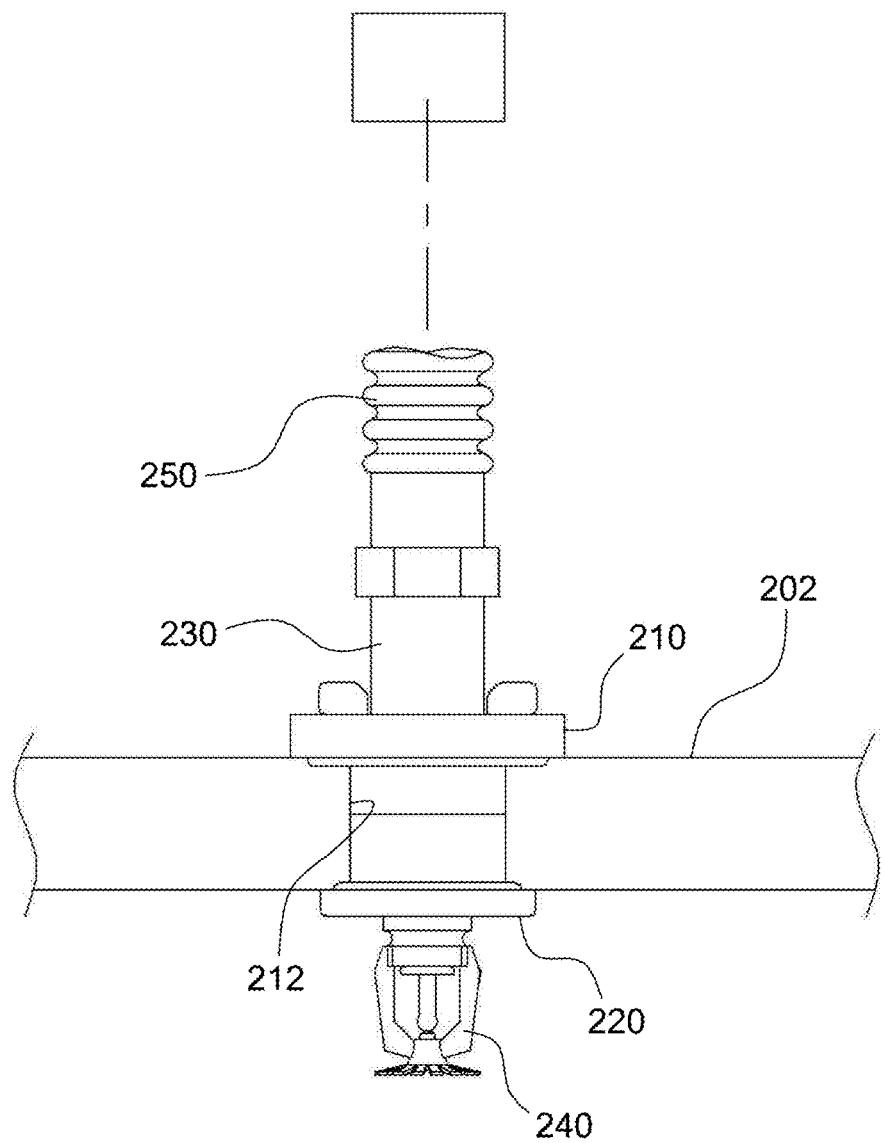
FIG. 2 is a perspective view of a sprinkler coupling structure coupled to a conventional panel-type ceiling.

A sprinkler coupling structure according to an embodiment of the present disclosure will be described in detail with reference to the accompanying drawings.

The sprinkler structure of the present disclosure allows a reducing nipple, which could only be assembled on a mold bar ceiling formed by placing panels between mold bars, to be used for a flat ceiling formed by connecting only panels. As shown by reference numeral 1 in FIGS. 3 and 4, a sprinkler using the sprinkler coupling structure of the present disclosure includes a reducing nipple 10, a head 20, a nipple fixing means 30, and a head protection net 40.

Figure 4:
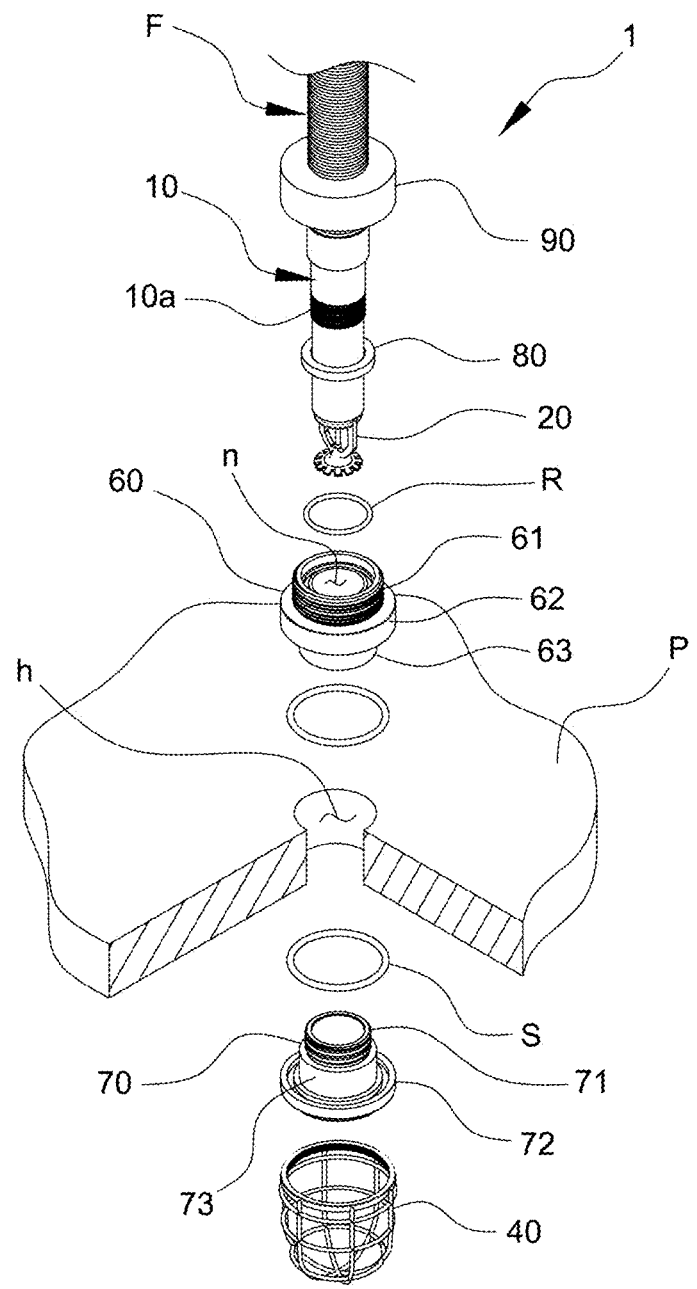
FIG. 4 is a perspective view showing a development view of FIG. 3.

As shown in FIG. 4, the reducing nipple 10 is a body of a sprinkler into which fire extinguishing water flows in, is manufactured integrally with a flexible pipe body F, whose upper side is connected from a water supply source and into which the fire extinguishing water flows, and delivers the fire extinguishing water to the head 20 to be described later through the inner space thereof.

Figure 3:
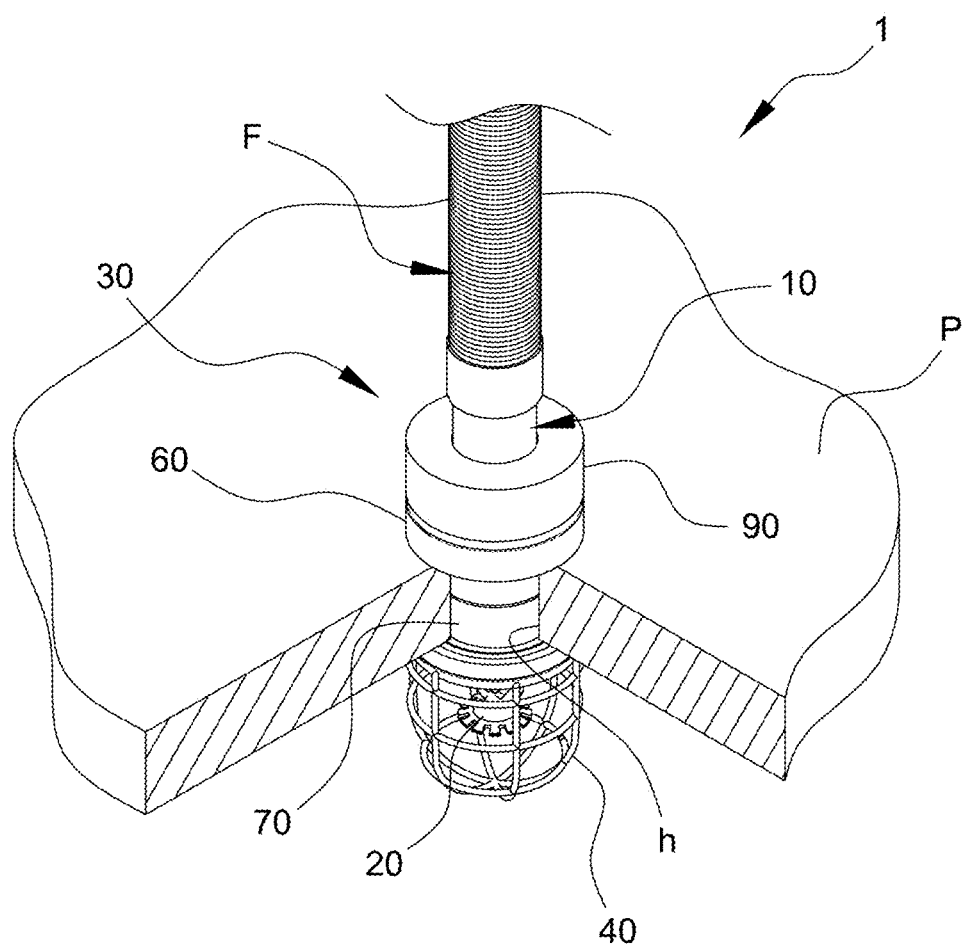
FIG. 3 is a perspective view of a sprinkler coupling structure in which a flexible pipe body and a reducing nipple are integrally coupled and a nipple fixing means is provided according to an embodiment of the present disclosure.
Figure 5:
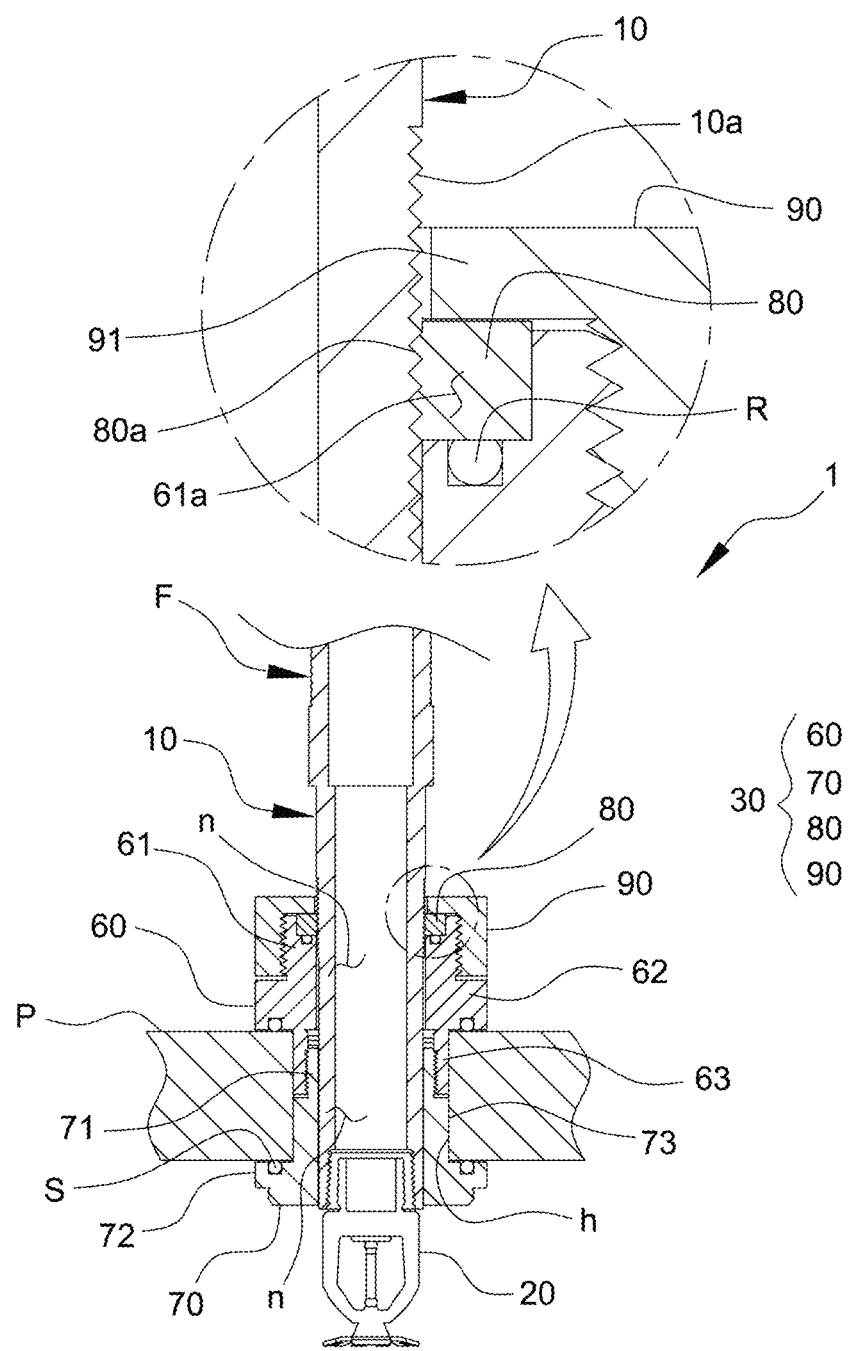
FIG. 5 is a longitudinal cross-sectional view showing the first embodiment in which the protruding height of the reducing nipple is adjusted by adjusting an adjustment member in the longitudinal cross-section of FIG. 3.

In addition, as shown in FIGS. 3 and 5, since the reducing nipple 10 penetrates a hole h of a ceiling panel P used in a flat ceiling while being integrally combined with the flexible pipe body F and is detachable from the ceiling panel P, by separating the reducing nipple 10 from the ceiling panel P and then taking the entire reducing nipple 10 and the flexible pipe body F out of the ceiling panel P without separating the reducing nipple 10 and the flexible pipe body F, the head 20 may be replaced on the ceiling panel P, thereby preventing the fire extinguishing water from leaking from the reducing nipple 10 into the indoor space where the sprinkler is installed.

The head 20 is a part that injects the fire extinguishing water supplied from the water supply source through the reducing nipple 10. As shown in FIG. 3, the head 20 is detachably coupled to the lower end of the reducing nipple 10 through screw coupling, etc., and in the event of a fire, the head 20 sprays down the fire extinguishing water supplied to the nipple from the water supply source through the pipe body, and protrudes from the lower side of the ceiling panel P so that the spraying is evenly performed on the lower side of the ceiling panel P.

The nipple fixing means 30 is a part that fixes the reducing nipple 10 to the ceiling panel P, and enables adjustment of the height at which the head 20 coupled to the lower end of the reducing nipple 10 protrudes. The nipple fixing means 30 includes an upper unit 60, a lower unit 70, an adjustment member 80 and a fastening member 90 as shown in FIGS. 4 and 5.

The upper unit 60 is located on top of the ceiling panel P. As shown in FIG. 4, a nipple hole n is formed in the center of the upper unit 60, and the reducing nipple 10 is inserted through the nipple hole n. The upper unit 60 includes a first portion 61 and a second portion 62.

As shown in FIG. 5, the first portion 61 is a part connected to and fixedly coupled to the reducing nipple 10, and is formed with a small outer diameter at the upper part of the outer side of the upper unit 60.

In addition, as shown in FIGS. 4 and 5, since the reducing nipple 10 is inserted into the nipple hole n through the upper end of the first portion 61 and comes into contact with a part of the inner circumferential surface of the nipple hole n, a portion of the upper part of the inner circumferential surface of the nipple hole n is finished, preventing fine dust from entering through the through hole h.

The second portion 62 is a part that supports the first portion 61 so that the first portion 61 does not escape through the through hole h. As shown in FIGS. 4 and 5, the second portion 62 is formed under the first portion 61 with a larger diameter than the first portion 61, and the lower surface of the second portion 62 contacts the upper surface of the ceiling panel P and is seated on the upper side of the through hole h, preventing dust or fire extinguishing water from entering through the through hole h between the lower surface of the second portion 62 and the upper surface of the ceiling panel P.

A third portion 63 in the upper unit 60 is a part that is inserted into the through hole h of the ceiling panel P, and as shown in FIGS. 4 and 5, is formed at the bottom of the second portion 62 to have a smaller diameter than the second portion 62 and to be inserted into the through hole h. The third portion 63 has an outer circumference similar to the size of the inner circumference of the through hole h, preventing dust or fire extinguishing water from entering between the through hole h and the third portion 63.

The lower unit 70 is a part fitted into the lower part of the through hole h. As shown in FIG. 4, the lower unit 70 has a nipple hole n formed in the center, through which the reducing nipple 10 is inserted. The lower unit 70 includes a first portion 71 and a second portion 72.

The first portion 71 is inserted into the through hole h from the bottom of the ceiling panel P and coupled to the third portion 63 of the upper unit 60. The first portion 71 may be fastened in various structures. As shown in FIGS. 4 and 5, when the first portion 71 is formed as a cylinder having a male thread on the outer circumference and fastened with a female thread formed on the inner circumferential surface of the third portion 63, the upper unit 60 and the lower unit 70 may be firmly fastened by the first portion 71 passing through the through hole h.

Figure 7:
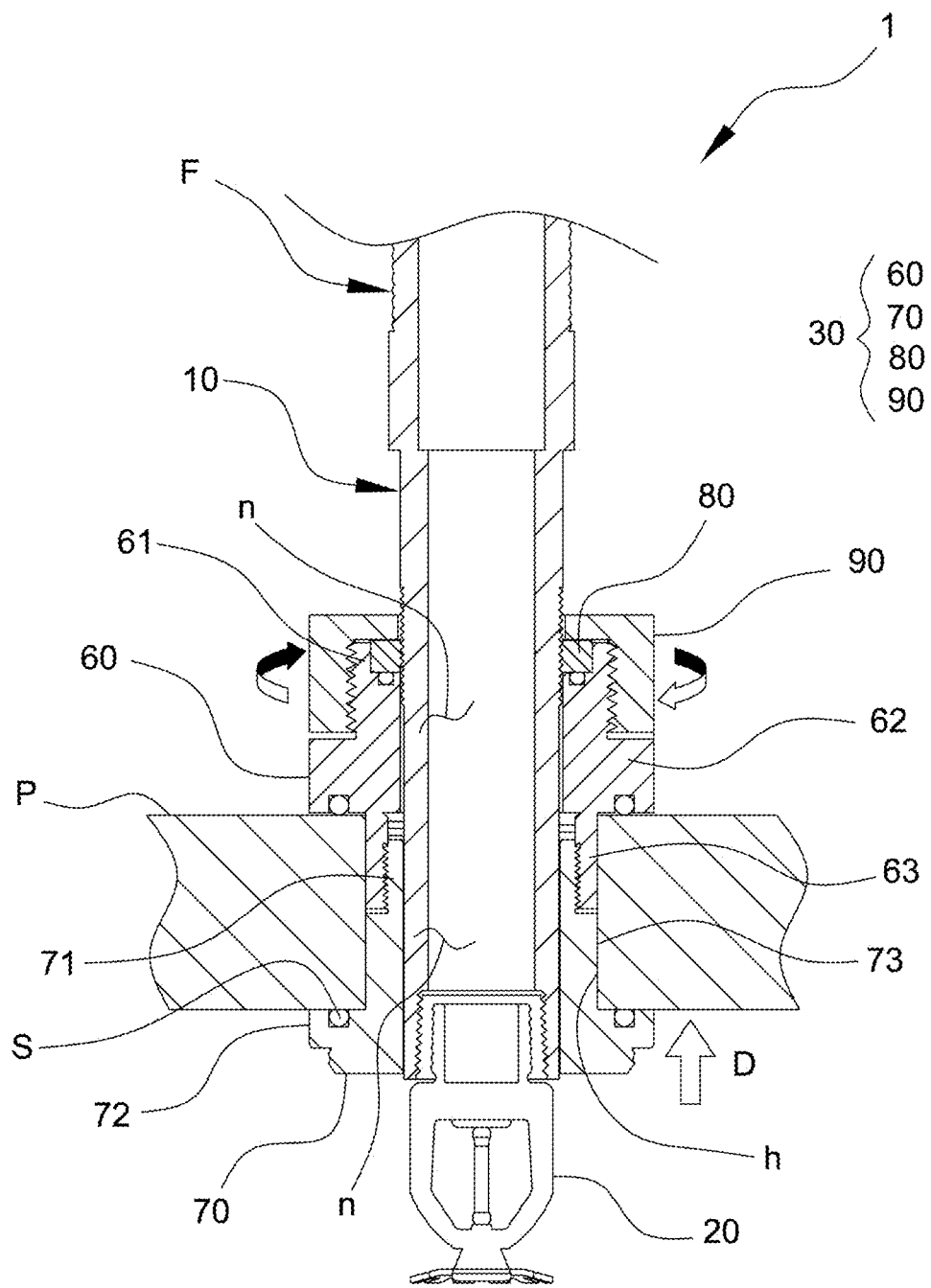
FIG. 7 is a longitudinal cross-sectional view showing a state in which a lower unit is in close contact with an upper unit along the upper side when a fastening member is fastened to the upper unit in the longitudinal cross-section of FIG. 3.

The second portion 72 is formed under the first portion 71, has an outer diameter larger than the through hole h, and has an upper surface in contact with the bottom surface of the ceiling panel P. As shown in FIG. 5, when the first portion 71 is fastened to the third portion 63, the ceiling panel P is interposed between the second portion 72 and the third portion 63, the gap between the second portion 62 of the upper unit 60 and the ceiling panel P and the gap between the second portion 72 of the lower unit 70 and the ceiling panel P are sealed with the tightening force of the screw as shown in FIG. 7, preventing dust or fire extinguishing water from entering into the space below the ceiling panel P through the through hole h from the space above the ceiling panel P or from inside the through hole h.

Meanwhile, the lower unit 70 further includes a cylindrical portion 73 between the first portion 71 and the second portion 72. As the outer circumferential surface of the cylindrical portion 73 closes the inner circumferential surface of the through hole h as shown FIG. 5, the cylindrical portion 73, together with the second portion 62 of the upper unit 60, prevents fine dust and the like entering the through hole h.

The adjustment member 80 is seated on the upper unit 60 to support the reducing nipple 10 and to adjust the height of the reducing nipple 10 and the head 20. The adjustment member 80 is formed in a ring shape and fitted to the outer circumference of the reducing nipple 10 as shown in FIG. 4, and may be fastened to the reducing nipple 10 in various ways. As shown in FIGS. 4 and 5, when a male thread portion 10a is formed on the outer circumferential surface of the reducing nipple 10 and a female thread portion 80a fastened to the male thread portion 10a is formed on the inner circumferential surface of the adjustment member 80, by fastening the female thread portion 80a on the male thread portion 10a to rotate the reducing nipple 10, the adjustment member 80 is fastened to the reducing nipple 10 as shown in FIG. 5.

In addition, when adjusting the height of the reducing nipple 10 and the head 20 with the adjusting member 80, by rotating the adjustment member 80 to tighten or loosen the female thread portion 80a to or from the male thread portion 10a, the adjustment member 80 ascends or descends along the outer circumferential surface of the reducing nipple 10. Since the height of the upper part of the upper unit 60 on which the adjustment member 80 is seated is fixed, when the adjustment member 80 is lowered and fastened to the lower part of the male thread portion 10a, the reducing nipple 10 and the head 20 may be positioned higher relative to the upper unit 60 as shown in FIG. 5, while when the adjustment member 80 is raised and fastened to the upper part of the male thread portion 10a, the reducing nipple 10 and the head 20 may be positioned lower relative to the upper unit 60 as shown in FIG. 6.

Figure 6:
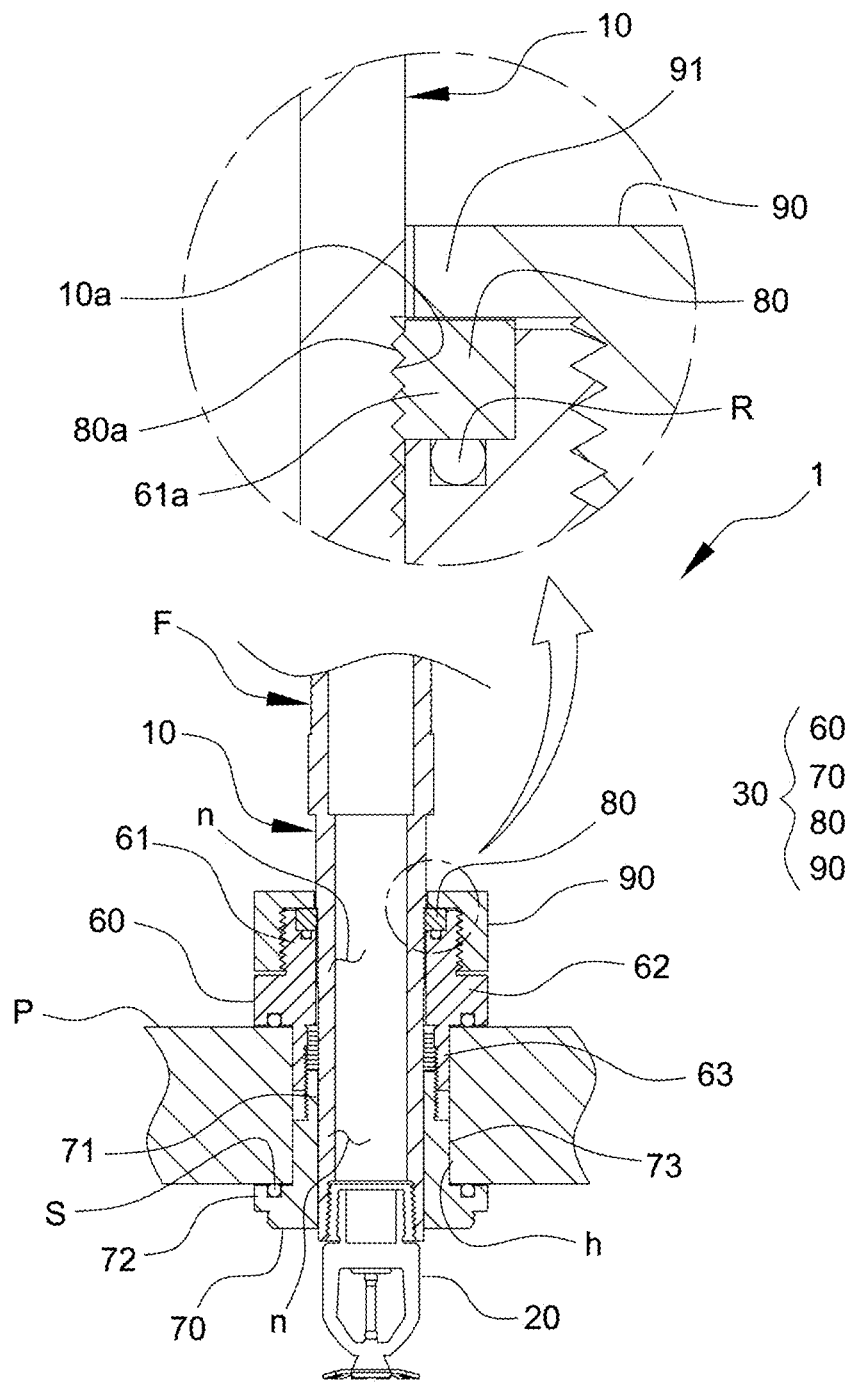
FIG. 6 is a longitudinal cross-sectional view showing the second embodiment in which the protruding height of the reducing nipple is adjusted by adjusting an adjustment member in the longitudinal cross-section of FIG. 3.

Therefore, as shown in FIGS. 5 and 6, since the nipple fixing means 30 is provided with the adjustment member 80, when the ceiling panel P is thick, by adjusting the position of the adjustment member 80 on the outer circumference of the reducing nipple 10 with a screw, the height of the head 20 may be adjusted as the head 20 coupled to the lower end of the reducing nipple 10 protrudes downward more from the through hole h of the ceiling panel P as shown in FIG. 6. Accordingly, the through hole h does not interfere with the discharge of the fire extinguishing water from the head 20, making the water discharge evenly.

The fastening member 90 is a part that presses adjustment member 80 to fix the reducing nipple 10 to the upper unit 60, and may be formed in various shapes. As shown in FIGS. 3 and 4, the fastening member 90 may be formed in a cylindrical shape so that it can be easily gripped during assembly.

In addition, as shown in FIGS. 3 and 4, the fastening member 90 is inserted into the outer circumference of the reducing nipple 10 to fasten the reducing nipple 10 and the upper unit 60. A male thread is formed on the outer circumferential surface of the first portion 61 of the upper unit 60 and is fastened with a female thread of the fastening member 90.

At this time, as described above, the upper unit 60 has the second portion 62 formed on the lower part thereof and the first portion 61 formed on the upper part thereof, the male thread fastened to the female thread of the fastening member 90 is formed in the first portion 61 so that the fastening member 90 of an appropriate size may be used.

In addition, when fastening the fastening member 90 to the first portion 61, the reducing nipple 10 needs to be fastened to the upper unit 60 by the fastening member 90. To this end, a portion of the fastening member 90 from the lower end of the inner circumferential surface thereof is expanded radially outward to form a pressing jaw 91 that presses the adjustment member 80 as shown in FIGS. 5 and 6.

Accordingly, as shown in FIG. 7, when the reducing nipple 10 is inserted from the top of the nipple hole n of the upper unit 60 and passes through the nipple hole n of the lower unit 70, and the adjustment member 80 is inserted into the upper side of the upper unit 60, that is, the upper surface of the first portion 61 or a seating groove 61a of the upper side of the first part 61 as shown in FIGS. 5 to 7 before screwing the fastening member 90 to the first portion 61, the pressing jaw 91 of the fastening member 90 presses the upper surface of the adjustment member 80 as shown in FIG. 5. The stronger the fastening of the fastening member 90 to the first portion 61, the more the adjustment member 80 is pressed toward the upper unit 60 by the pressing jaw 91, so that the reducing nipple 10 is fastened to the upper unit 60 by the fastening member 90.

At this time, an O-ring R is inserted into the seating groove 61a on the surface in contact with the adjustment member 80 as shown in FIGS. 5 and 6. Accordingly, when the fastening member 90 is fastened to the upper unit 60, the O-ring R is in close contact with the lower surface of the adjustment member 80 and the upper surface of the upper unit 60, preventing dust or fire extinguishing water from entering into the nipple hole h through the gap between the adjustment member 80 and the seating groove 61a.

In order to allow the fastening member 90 to press the adjustment member 80 more effectively in the above structure having the fastening member 90 and the adjustment member 80, when the fastening member 90 is fastened to the upper unit 60 and presses the adjustment member 80, the adjustment member 80 should rise according to the rotational direction of the fastening member 90 while being in close contact with the fastening member 90. To this end, when the upper unit 60 and the fastening member 90 are fastened with a typical right-handed screw, the female thread portion 80a of the adjustment member 80 and the male thread portion 10a of the reducing nipple 10 need to be fastened with a left-handed screw, so that when the fastening member 90 presses the adjustment member 80 while being fastened with the right-handed screw, the adjustment member 80 rises as opposed to the fastening member 90 by the female threaded fastening of the adjustment member 80 and the reducing nipple 10. As a result, the descending fastening member 90 presses the ascending adjustment member 80 so that more effective fastening may be achieved.

Meanwhile, as shown in FIG. 7, as the fastening member 90 is fastened to the first portion 61 with a strong fastening force, the fastening member 90 pulls the upper unit 60 upward and the upper unit 60 has an upward force in the D direction of FIG. 7. As the upper unit 60 has the upward force, the lower unit 70 fastened with the upper unit 60 also has the upward force in the direction D of FIG. 7.

Accordingly, as shown in FIG. 7, the upper surface of the second portion 72 is strongly adhered to the lower surface of the ceiling panel P by the upward force of the lower unit 70, and thus the gap between the through hole h and the upper unit 60 and the gap between the through hole h and the lower unit 70 are completely sealed.

Moreover, as shown in FIGS. 4 and 7, in the case of placing an adhesive member S such as an O-ring or rubber packing on the upper surface of the second portion 72 of the lower unit 70, when the fastening member 90 is fastened to the upper unit 60, the adhesive member S comes into close contact with the bottom surface of the ceiling panel P, further strengthening the sealing between the upper surface of the second portion 72 and the bottom surface of the ceiling panel P.

Therefore, when the upper unit 60 of the nipple fixing means 30 and the fastening member 90 are combined and the fastening member 90 presses the adjustment member 80, the entire upper unit 60 rises by the fastening force of the fastening member 90, and the lower unit 70 combined with the upper unit 60 also rises, so that the lower unit 70 may be strongly adhered to the bottom surface of the ceiling panel P, which means that the through hole h of the ceiling panel P may be firmly sealed by the close contact of the lower unit 70 on the bottom surface of the ceiling panel P without relying on the fastening force of the upper unit 60 and the lower unit 70. Accordingly, it is possible to more effectively prevent dust or fire extinguishing water from entering the room through a sprinkler 1 or the through hole h from the space above the ceiling panel P in normal times.

In addition, since the sprinkler 1 is assembled by a simple method of configuring the nipple fixing means 30 for fixing the reducing nipple 10 to the ceiling panel P with the upper unit 60, the lower unit 70, the adjustment member 80 and the fastening member 90, inserting the upper unit 60 and the lower unit 70 into the through hole h of the ceiling panel P so as to be mutually fastened, and pressing the adjustment member 80 after placing the adjustment member 80 coupled to the reducing nipple 10 on the upper side of the upper unit 60 and then fastening the fastening member 90 to the upper side of the upper unit 60, the sprinkler 1 may be assembled without complicated processes, so that the assembly of the sprinkler 1 may be done easily and conveniently.

Furthermore, although the reducing nipple 10 and the flexible pipe body F cannot be rotated by themselves since the reducing nipple 10 and the flexible pipe body F are manufactured integrally with each other, by using the fastening member 90 fitted so as to be freely rotatable and slidable on the outer circumferential surface of the reducing nipple 10 and the flexible pipe body F as shown in FIG. 4, the reducing nipple 10 and the flexible pipe body F may be easily and conveniently detached from the upper unit 60 without rotating the reducing nipple 10 and the flexible pipe body F.

The head protection net 40 is a part that protects the head 20 by surrounding the head 20 from the lower side of the ceiling panel P. As shown in FIG. 3, the head protection net 40 is made of a dome-shaped wire mesh to surround the head 20, and forms a female thread on the upper end thereof and is screwed so as to be detachable to the screw formed on the outer circumferential surface of the second portion 72, so that the head protection net 40 may be easily detached and replaced when damaged.

In the above, specific embodiments of the present disclosure have been described as examples, but these are only for the purpose of explanation and are not intended to limit the protection scope of the present disclosure. It will be apparent to those skilled in the art that various substitutions, modifications, and changes are possible within the scope of the technical spirit of the present disclosure.

INDUSTRIAL APPLICABILITY

According to the sprinkler coupling structure, since the reducing nipple is detachable from the ceiling panel while being integrally combined with the flexible pipe body, by separating the reducing nipple and an upper unit and then taking the entire reducing nipple and the flexible pipe body out of the ceiling panel without separating the reducing nipple and the flexible pipe body, the head may be replaced on the ceiling panel, preventing the leakage of fire extinguishing water from the reducing nipple into the indoor space where a sprinkler is installed.

The invention claimed is:
1. A sprinkler coupling structure comprising:
a reducing nipple (10) configured to penetrate a through hole (h) formed in a ceiling panel (P), and manufactured integrally with a flexible pipe body (F) whose upper side is connected from a water supply source and into which fire extinguishing water flows;
a head (20) coupled to a lower end of the reducing nipple (10) and configured to spray the fire extinguishing water supplied from the water supply source through the reducing nipple (10);
a nipple fixing means (30) configured to fix and couple the reducing nipple (10) to the ceiling panel (P) so that a height at which the head (20) protrudes from the ceiling panel (P) is adjusted; and
a head protection net (40) configured to protect the head (20) from a lower side of the ceiling panel (P),
wherein the nipple fixing means (30) comprises:
an upper unit (60) located at a top of the through hole (h) of the ceiling panel (P) and configured to have a nipple hole (n) in a center thereof into which the reducing nipple (10) is inserted;
a lower unit (70) inserted from a bottom of the through hole (h) to be fixedly coupled to the upper unit (60), and configured to have a nipple hole (n) in a center thereof into which the reducing nipple (10) is inserted;
an adjustment member (80) coupled to an outer circumference of the reducing nipple (10) so that a height thereof is adjusted, and seated on an upper side of the upper unit (60) to support the reducing nipple (10); and
a fastening member (90) fastened to the upper side of the upper unit (60) and configured to fix the reducing nipple (10) to the upper unit (60) by pressing the adjustment member (80) when fastened to the upper unit (60),
wherein the reducing nipple (10) has a male thread portion (10a) formed on a portion of the outer circumference thereof, and the adjustment member (80) has a female thread portion (80a) fastened to the male thread portion (10a) on an inner circumferential surface thereof,
wherein when the female thread portion (80a) rotates on the male thread portion (10a), the adjustment member (80) ascends or descends along the outer circumferential surface of the reducing nipple (10).
2. The sprinkler coupling structure of claim 1, wherein the lower unit (70) comprises:
a first portion (71) inserted into the through hole (h) of the ceiling panel (P) and coupled to a lower side of the upper unit (60); and a second portion (72) formed under the first portion (71) and having an upper surface in contact with a lower surface of the ceiling panel (P), wherein the second portion (72) is fitted with an adhesive member(S) on the upper surface thereof, so that when the fastening member (90) is fastened to the upper unit (60), the adhesive member(S) comes into close contact with the lower surface of the ceiling panel (P).

3. The sprinkler coupling structure of claim 2, wherein the upper unit (60) is fitted with an O-ring (R) on a surface in contact with the adjustment member (80), so that when the fastening member (90) is fastened to the upper unit (60), the O-ring (R) comes into contact with a lower surface of the adjustment member (80) and an upper surface of the upper unit (60).

* * * * *